Patented Aug. 26, 1952

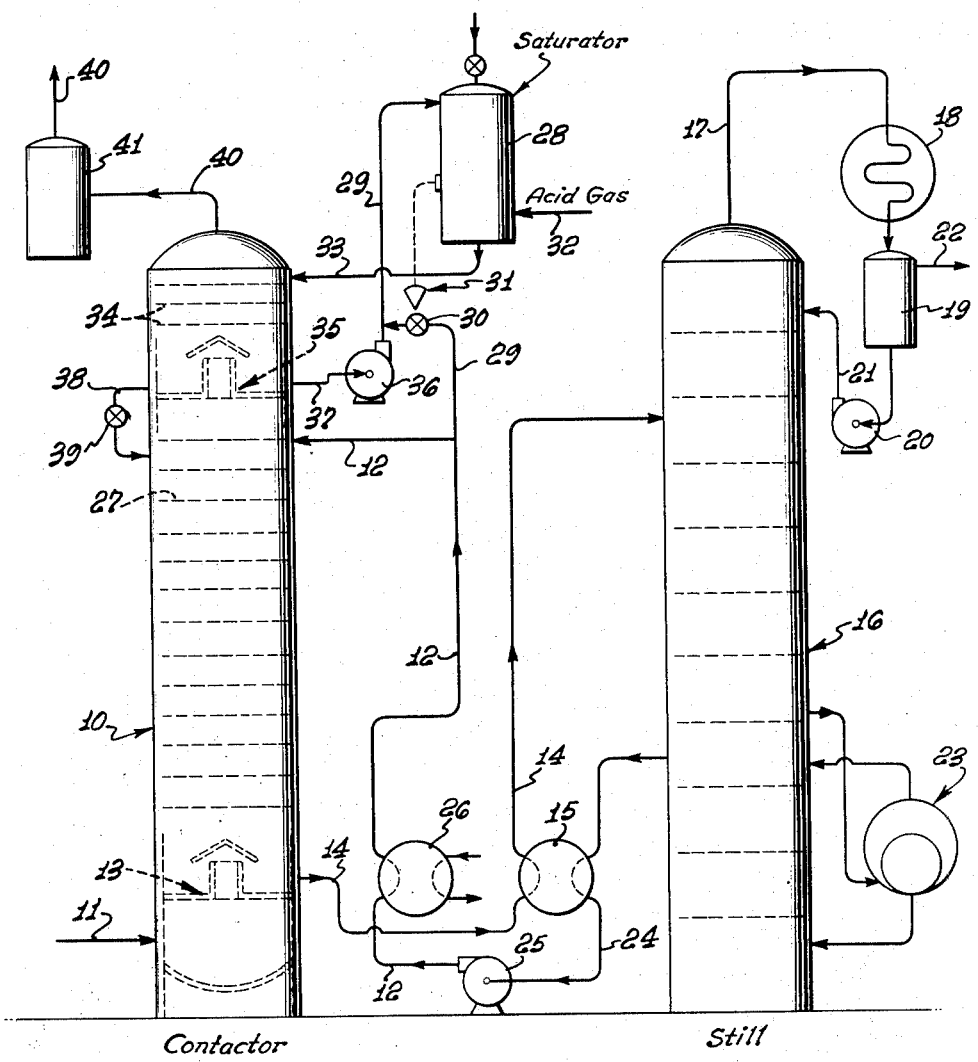

2,608,462

UNITED STATES PATENT OFFICE 2,608,462

AMINE ABSORBENT GAS TREATING SYSTEM

Henry D. Frazier, Alhambra, and Fred C. Riesenfeld, Hollywood, Calif., assignors to The Fluor Corporation, Ltd., Los Angeles, Calif., a corporation of California Application March 26, 1949, Serial No. 83,740

9 Claims. (Cl. 23—2)

This invention has to do with advances and improvements in processes for treating gaseous mixtures by contact with liquid amine solutions, to remove from the gas one or more acidic impurities. Particularly the invention is directed to the treatment of hydrocarbon natural or refinery gases containing such acidic impurities as carbon dioxide and hydrogen sulfide, primarily for the purpose of removing the hydrogen sulfide.

It is customary practice to pass the gaseous mixture through and in intimate contact with an amine solution circulated through a contacting zone from which the rich solution is regenerated in a heating zone and then returned to the gas contacting stage. The conventional contactor consists of a multiple tray column through which the gas flows upwardly and countercurrently to the down-flowing amine solution introduced onto a top tray of the treating section. Ordinarily substantially all the hydrogen sulfide in the gas being treated will be absorbed in the amine solution, and most if not virtually all of the carbon dioxide content of the gas will similarly be absorbed. The capacity of the solution for acid gas absorption, as well as dehydration of the gas when desirable, is favored by the use of glycol-amine solutions of the character dealt with in Hutchinson Patent Number 2,177,068.

In proper contactor column operation, a close approach to equilibrium relationship exists on the top contactor section tray between the components of the leaving gas stream and the lean amine solution. And by virtue of that relationship, some of the amine will be carried in the treated gas stream. We refer to such amine as being entrained in the gas, and in so doing, include both liquid and vaporized amine that may be carried by the gas flowing beyond its contact with the lean amine solution. Generally, the treated gas may contain little if any carbon dioxide, for the reason that while its presence, as contrasted with any substantial hydrogen sulfide content, may be unobjectionable in the treated gas, the maintenance of such conditions of contactor operation as will permit passage of considerable quantities of carbon dioxide, ordinarily would allow an objectionable residue of hydrogen sulfide in the treated gas. Consequently the carbon dioxide concentration in the treated gas stream is insufficient to effect the amine conversion discussed in the following.

Considering now another aspect of the contactor operation, it is desirable for highest treating efficiency that maximum intimacy of contact be had between the gas and amine solution, and accordingly, that the amine have the lowest permissible viscosity consistent with high basicity. Heretofore, an undesirable limitation has existed, relative to the use of the lower molecular weight and less viscous amines, due to the fact that their higher vapor pressures necessarily entail high vaporization losses at the top tray under the equilibrium conditions referred to above. Accordingly the useable amines have been selected to best compromise molecular weight and vapor pressure conditions.

The invention has in common with the developments disclosed in copending applications of Frazier, Ser. No. 83,738, entitled Prevention of Amine Losses in Gas Treating Systems, and Frazier and Kohl, Ser. No. 83,739, entitled Systems for the Treatment of Gases, the general objective of reacting the amine entrained in the treated gas stream, with an acidic compound to convert the amine to a relatively high molecular weight compound of such low vapor pressure as to be readily separable and recoverable from the gas. The present invention is particularly directed to a method whereby the amine solution circulated in the plant treating cycle is employed as a carrier for the acidic compound to be reacted with the entrained amine, all in a system of continuous operation whereby the amine solution finally to contact the gas has such acidic content or concentration as will maintain the amine constituency of the solution itself, as well as any amine entrainment contacting the solution, in the form of a reaction product returnable to the treating amine cycle for regeneration and having such low vapor pressure as to resist consequential entrainment in the gas stream. Since, accordingly, the resistance of the amine to entrainment in the finally treated gas is in effect governed by the molecular weight and vapor pressure characteristics of the amine-acidic compound reaction product rather than the composition of the amine as it exists in the antecedent treating stage, it becomes possible to use amines of abnormally low molecular weight and desirable fluidity, since their products of reaction with the acidic additive have vapor pressures sufficiently low for all purposes of minimizing entrainment.

The invention contemplates the use of any suitable amine or mixture of amines, included for example in the class of aliphatic amines, in which the amino radical is attached to a carbon atom, which in turn is attached to one or more aliphatic or straight chain groups, saturated or unsaturated, or to a saturated or unsaturated ring structure. The preferred amines are those of low viscosity, and having a vapor pressure at least as high as the vapor pressure of monoethanolamine. The less viscous and higher vapor pressure amines include amines of lower molecular weight and higher vapor pressure than monoethanolamine, typically methylamine, ethylene diamino, the normally liquid alkylene polyamines, normally liquid alkylamines whose vapor pressure is higher than that of monoethanolamine and higher basic equivalent than monoethanolamine.

Briefly, our preferred procedure is to pass a portion of the lean amine solution through a zone wherein the amine is saturated with carbon dioxide to form the low vapor pressure carbamate, which is continuously circulated through a second stage contacting zone in contact with the gas stream following its release from the lean amine solution. By either or both reaction with available carbon dioxide in the carbamate stream or physical absorption therein, the amine carry-over from the treating stage is effectively trapped. As will appear, provision is made for continuous regeneration of a portion of the carbamate stream by return to the amine solution undergoing regeneration in the still.

Various additional features and objects of the invention as well as the details of a typical embodiment thereof, will be understood to better advantage from the following detailed description of the accompanying drawing, which illustrates the process in flow sheet form.

Referring to the drawing, the gas treating system may be taken typically to comprise a usual contactor column 10 to the base of which is fed through line 11 the gaseous mixture to be treated, and consisting typically of a hydrocarbon natural or refinery gas containing such acidic impurities as either or both carbon dioxide and hydrogen sulfide. The gas passes upwardly through the column counter-currently to a down flowing stream of lean amine solution introduced through line 12 and consisting typically of a straight amine absorbent containing from 10 to 75% aliphatic amine (e. g. monoethanolamine) in water, or a combination glycol-amine solution composed say of from 50 to 80% glycol, 40 to 15% amine, and 5 to 20% water.

The rich amine solution removed from the contactor chimney tray 13, is discharged through line 14 and exchanger 15 to the still column 16 wherein the rich solution is subjected to heating and regeneration. Moisture and acid gases leaving the still through line 17 are cooled in condenser 18 and water condensate collecting in accumulator 19 is returned as reflux to the still column by pump 20 through line 21. The uncondensed gases leave the system through line 22. Heat is supplied to the base of the still column as by the usual reboiler generally indicated at 23. From the still the lean absorbent passes through line 24, exchanger 15 to the pump 25, and is discharged through line 12 and cooler 26 to the contactor column 10.

A portion of the lean solution being returned to the contactor through line 12 flows to the top of a saturator column 28 through line 29 under control of valve 30, operated by the conventionally indicated regulator 31, in accordance with the liquid level in the saturator. An acid gas corresponding to an acidic constituent of the gas mixture fed to the system through line 11 and consisting preferably of carbon dioxide, is introduced to the base of the saturator through line 32. In flowing upwardly within the saturator, the carbon dioxide is absorbed in the downflowing amine solution, the quantity of carbon dioxide thus introduced preferably being sufficient to completely saturate the amine solution. The degree of saturation may be such that additional carbon dioxide becomes dissolved or carried as such in the liquid amine solution.

In the saturator 28, the amine is converted by reaction with the carbon dioxide gas, to the relatively high molecular weight carbamate which, by reason of its low vapor pressure, may be employed as a carrier for carbon dioxide to be reacted with amine entrained in the gas stream after its removal from the lean solution in the contactor tray 27, without consequential entrainment of the carbamate itself in the gas. Accordingly, the saturated solution passing from the saturator 28 through line 33 is shown to be introduced onto one or more trays 34 in the top section of the contactor, wherein the downflowing saturated solution is intimately admixed with the main gas stream and caused to entrap any amine entrainment or carry-over above the tray 27. Entrapment of the entrained amine may occur to some extent by physical retention in the carbon dioxide-saturated amine solution, but mainly by reaction with available carbon dioxide in the solution to become converted to the low vapor pressure carbamate. The solution flowing down through trap 34 is collected on the chimney tray 35 and returned to the saturator by pump 36 through line 37 connecting with line 29. A portion of the solution on tray 35 may be returned to the amine solution stream being recirculated between the contactors and still, as by way of line 38 through which the carbamate solution flows under control of valve 39 into the treating section of the contactor to be circulated for regeneration in the still.

As previously observed, the conversion in the saturator of whatever amine used in the plant treating cycle, to a relatively high molecular weight, low vapor pressure compound, and specifically a carbamate resulting from the reaction of the amine with carbon dioxide, permits the use in the lower or treating section in the contactor, of low molecular weight amines which, because of their high vapor pressures could not ordinarily be used for gas treating because of excessive vaporization or entrainment losses of the amine in the gas stream. Ordinarily it is not considered feasible to use amines having vapor pressures higher than the vapor pressure of monoethanolamine. In the present system the higher vapor pressure amines may be employed, with resultant greater treating efficiency for reasons such as the greater intimacy of contact made possible with the less viscous amines, by reason of the fact that the vapor pressure of the carbamate on the top trays 34 will be sufficiently low to avoid any consequential losses by vaporization or entrainment in the outlet gas stream discharged through line 40. The treated gas is shown to be discharged through the conventional scrubber 41.

We claim:

1. The method that includes passing through a first liquid amine solution stream a gaseous stream containing an acidic constituent of the group consisting of hydrogen sulfide and carbon dioxide and reactive with the amine, the gas leaving said solution containing entrained amine, contacting and substantially saturating a second amine-containing stream with carbon dioxide, and contacting said second stream with the gas stream after its passage through said first amine stream to absorb in said second stream amine entrained in the gas.

2. The method that includes passing through a first liquid amine solution stream a gaseous stream containing an acidic constituent of the group consisting of hydrogen sulfide and carbon dioxide reactive with the amine, the gas leaving said solution containing entrained amine, and contacting the gas after its passage through said amine solution stream with a liquid amine substantially saturated with carbon dioxide.

3. The method that includes, continuously circulating a stream of a solution containing a liquid amine through a contacting zone and a heating and regenerating zone, passing a gaseous mixture containing an acidic constituent of the group consisting of hydrogen sulfide and carbon dioxide and through said contacting zone in intimate admixture with the amine solution, the gas leaving said solution containing entrained amine, passing a portion of said stream through a saturating zone and therein contacting and substantially saturating the amine solution with carbon dioxide, contacting the saturated amine solution in a second contacting zone with said gaseous mixture after its passage through said amine stream to absorb in the amine solution amine carried by the gas, and returning the amine solution from said second contacting zone to said circulated amine stream.

4. A method that includes, continuously circulating a stream of a solution containing a liquid amine through a contacting zone, and a heating and regenerating zone, passing a gaseous mixture containing hydrogen sulfide and carbon dioxide through said contacting zone in intimate admixture with the amine solution for absorption of the hydrogen sulfide, the gas leaving said solution containing entrained amine, passing a portion of said stream through a saturation zone and therein absorbing carbon dioxide in the amine solution, then contacting the solution taken from said saturating zone and in a second contacting zone with said gaseous mixture after its passage through said amine stream to retain amine carried by the gas, and returning the amine solution from said second contacting zone to said circulated amine stream.

5. The method that includes, continuously circulating a stream of a solution containing a liquid amine having a vapor pressure higher than the vapor pressure of monoethanolamine through a contacting zone and a heating and regenerating zone, passing a gaseous mixture containing an acidic constituent through said contacting zone in intimate admixture with the amine solution, the gas leaving said solution containing entrained amine, passing a portion of said stream through a saturating zone and therein substantially saturating the amine solution with an acid gas, contacting the saturated amine solution in a second contacting zone with said gaseous mixture after its passage through said amine stream to retain amine carried by the gas, and returning the amine solution from said second contacting zone to said circulated amine stream.

6. The method that includes, continuously circulating a stream of a solution containing a liquid amine having a vapor pressure higher than the vapor pressure of monoethanolamine through a contacting zone and a heating and regenerating zone, passing a gaseous mixture containing hydrogen sulfide and carbon dioxide through said contacting zone in intimate admixture with the amine solution for absorption of the hydrogen sulfide, the gas leaving said solution containing entrained amine, passing a portion of said stream through a saturation zone and therein absorbing carbon dioxide in the amine solution, then contacting the solution taken from said saturating zone and in a second contacting zone with said gaseous mixture after its passage through said amine stream to retain amine carried by the gas, and returning the amine solution from said second contacting zone to said circulated amine stream.

7. The method that includes passing a gaseous mixture containing an acidic constituent of the group consisting of hydrogen sulfide and carbon dioxide through a contacting zone, passing through said zone a stream of liquid amine solution reactive with said acidic constituent, the gas leaving said solution containing entrained amine, circulating the rich amine solution from said contacting zone to a heating and regenerating zone and returning lean solution from the heating zone to the contacting zone, passing a portion of the lean solution in a second stream through a saturating zone and therein substantially saturating the solution with carbon dioxide, contacting the gas after its passage through said amine solution in the contacting zone with said second stream of saturated solution to entrap amine entrained in the gas, and returning at least a portion of said second stream to the first mentioned amine solution.

8. The method that includes passing a gaseous mixture containing an acidic constituent of the group consisting of hydrogen sulfide and carbon dioxide through a contacting zone, passing through said zone a stream of liquid amine solution reactive with said acidic constituent, the gas leaving said solution containing entrained amine, circulating the rich amine solution from said contacting zone to a heating and regenerating zone and returning lean solution from the heating zone to the contacting zone, passing a portion of the lean solution in a second stream through a saturating zone and therein substantially saturating the solution with carbon dioxide, contacting the gas after its passage through said amine solution in the contacting zone with said second stream of saturated solution to entrap amine entrained in the gas, recirculating a portion of said second stream to said saturating zone, and returning another portion of said second stream to the first mentioned amine solution.

9. The method that includes passing a gaseous mixture containing an acidic constituent of the group consisting of hydrogen sulfide and carbon dioxide through a contacting zone, passing through said zone a stream of liquid amine solution reactive with said acidic constituent and having a vapor pressure higher than the vapor pressure of monoethanolamine, the gas leaving said solution containing entrained amine, circulating the rich amine solution from said contacting zone to a heating and regenerating zone and returning lean solution from the heating zone to the contacting zone, passing a portion of the lean solution in a second stream through a saturating zone and therein substantially saturating the solution with carbon dioxide, contacting the gas after its passage through said amine solution in the contacting zone with said second stream of saturated solution to entrap amine entrained in the gas, and returning at least a portion of said second stream to the first mentioned amine solution.

HENRY D. FRAZIER.
FRED C. RIESENFELD.

REFERENCES CITED

The following references are of record in the file of this patent:

UNITED STATES PATENTS

| Number | Name | Date |
|---|---|---|
| 1,925,198 | Melvill | Sept. 5, 1933 |
| 1,934,472 | Allen | Nov. 7, 1933 |
| 1,962,525 | Richardson | June 12, 1934 |
| 2,177,068 | Hutchinson | Oct. 24, 1939 |
| 2,368,595 | Johnson | Jan. 30, 1945 |
| 2,487,981 | Reed | Nov. 15, 1949 |